United States Patent [19]
Alexander et al.

[11] Patent Number: 5,986,782
[45] Date of Patent: Nov. 16, 1999

[54] SIGNAL-TO-NOISE MONITORING IN WDM OPTICAL COMMUNICATION SYSTEMS

[75] Inventors: Stephen B. Alexander, Millersville; Henry H. Yaffe, Reisterstown, both of Md.

[73] Assignee: Ciena Corporation, Linthicum, Md.

[21] Appl. No.: 08/865,654

[22] Filed: May 29, 1997

[51] Int. Cl.$^6$ .................................................. H04B 10/08
[52] U.S. Cl. .......................................... 359/110; 359/124
[58] Field of Search .................................. 359/110, 124, 359/127, 128, 130

[56] References Cited

U.S. PATENT DOCUMENTS

| | | | |
|---|---|---|---|
| 5,446,812 | 8/1995 | Hirst ............................................ | 385/24 |
| 5,504,609 | 4/1996 | Alexander et al. ...................... | 359/125 |
| 5,532,864 | 7/1996 | Alexander et al. ...................... | 359/177 |
| 5,696,615 | 12/1997 | Alexander ............................... | 359/134 |
| 5,712,716 | 1/1998 | Vanoli et al. ............................. | 359/125 |
| 5,815,299 | 9/1998 | Bayart et al. ............................ | 359/171 |

FOREIGN PATENT DOCUMENTS

| | | |
|---|---|---|
| 0714182 | 5/1996 | European Pat. Off. . |
| 0762672 | 3/1997 | European Pat. Off. . |
| 2272590 | 5/1994 | United Kingdom . |

*Primary Examiner*—Thomas Mullen
*Attorney, Agent, or Firm*—Margaret Burke

[57] ABSTRACT

The present invention provides an optical monitoring system for a WDM optical communication system. In an exemplary embodiment, the monitoring system includes a wavelength selecting device which receives a WDM optical communication signal comprising plural optical channels and optical noise (e.g., ASE). The wavelength selecting device separately outputs optical signals corresponding to each of the optical channels and at least one optical noise sample taken at a wavelength which is not occupied by one of the optical channels. At least one optical power meter optically communicates with the wavelength selecting device for measuring the optical power of each of the optical channels and the optical noise sample. The optical power meter outputs an electrical signal indicating the strength of a measured optical channel or of the optical noise sample. A data analyzer, such as a microprocessor, receives the electrical signals output by the power meter and calculates the optical noise at the wavelengths of each of the N optical channels based upon the measured noise sample. Using the calculated optical noise values, the data analyzer determines the signal to noise ratio of each optical channel. Advantageously, the technique of the present invention uses a minimum of power measurements to accurately determine the signal-to-noise ratios of the optical channels.

8 Claims, 3 Drawing Sheets

5,986,782

SIGNAL-TO-NOISE MONITORING IN WDM OPTICAL COMMUNICATION SYSTEMS

FIELD OF THE INVENTION

The present invention relates to signal monitoring in wavelength division multiplexed optical communication systems and, more particularly, to monitoring systems which measure both optical channel power and optical noise, thereby providing the signal-to-noise ratio for each optical channel in a WDM system.

BACKGROUND OF THE INVENTION

Wavelength division multiplexing (WDM) is a technique which substantially increases the capacity of existing fiber optic networks. In a WDM system, plural optical channels are carried over a single waveguide, each channel being assigned a particular wavelength. Through time division multiplexing (TDM), each optical channel can carry the same amount of information as a conventional, single-channel optical system. Using optical amplifiers, such as doped fiber amplifiers, plural optical channels are directly amplified simultaneously, facilitating the use of WDM systems in long-distance optical networks.

In order to monitor the operation of the optical network, it is desirable to know the signal levels and the optical noise at each optical channel wavelength. Because optical receivers are limited in sensitivity, the optical channel must have a sufficiently high signal-to-noise threshold to correctly distinguish the information contained on an optical channel within an acceptable error margin. Although the power levels of individual channels are easily measured at the end terminals in WDM optical systems, such power levels by themselves do not adequately relate to system performance since they fail to consider optical noise originating from optical amplifiers (amplified spontaneous emission-ASE) and other sources. Thus, there is a need in the art for improved optical monitoring systems which can measure optical power and generate signal-to-noise information for optical signals. Such optical monitoring systems could be used to produce signal-to noise information for each optical channel in a wavelength division multiplexed optical communication system. Further, there is a need in the art for determining optical channel signal-to-noise ratios at positions throughout the optical system, not merely at the end nodes. Such information could be used to present an accurate representation of overall system function and to aid in determining the location of equipment not performing to system specifications.

SUMMARY OF THE INVENTION

The present invention provides an optical monitoring system for a WDM optical communication system. The optical monitoring system measures both optical channel signals and an optical noise sample, using this information to calculate the signal-to-noise ratio for each optical channel in the WDM system. In an exemplary embodiment, the monitoring system includes a wavelength selecting device which receives a WDM optical communication signal comprising N optical channels, where N is a whole number greater than or equal to 2, and optical noise. The wavelength selecting device separately outputs optical signals corresponding to each of the N optical channels and at least one optical noise sample taken at a wavelength which is not occupied by one of the N optical channels. At least one optical power meter optically communicates with the wavelength selecting device for measuring the optical power of each of the N optical channels and the optical noise sample. The optical power meter outputs an electrical signal indicating the strength of a measured optical channel or of the optical noise sample. A data analyzer, such as a microprocessor, receives the electrical signals output by the power meter(s) and calculates the optical noise at each of the optical channels based upon the noise sample. Using the calculated optical noise, the data analyzer determines the signal to noise ratio of each optical channel.

DETAILED DESCRIPTION

Figure 1:
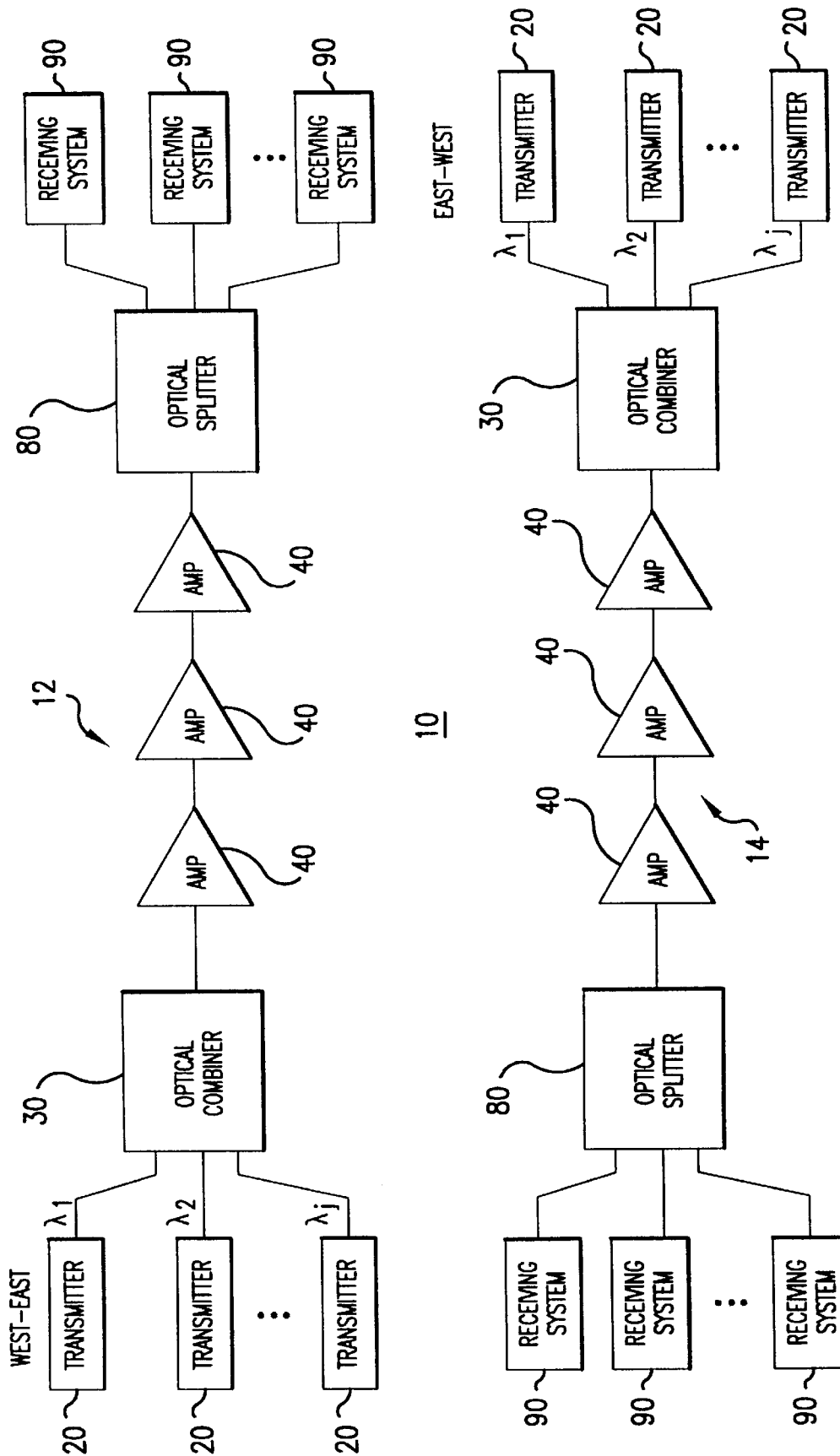
FIG. 1 schematically depicts a wavelength division multiplexed optical communication system with west-east and east-west transmission paths.

Turning now to the drawings in detail, FIG. 1 schematically depicts a wavelength division multiplexed optical communication system 10 having a west-east transmission path 12 and an east-west transmission path 14 according to one embodiment of the present invention. Optical communication system 10 includes a plurality of optical transmitters 20, each optical transmitter emitting an information-bearing optical signal at a transmission wavelength. The expression "information-bearing optical signal," as used herein, refers to an optical signal which has been coded with information, including, but not limited to, audio signals, video signals, and computer data. Typically, the wavelengths emitted by optical transmitters 20 are selected to be within the 1500 nanometer range, the range in which the minimum signal attenuation occurs for silica-based fibers. More particularly, the wavelengths emitted by the optical transmitters are generally selected to be in the range from 1530 to 1560 nanometers.

When optical transmitters 20 form part of an existing optical system, a plurality of remodulators can be employed. Such remodulators operate to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide. The use of optical remodulators ensures compatibility of optical communication system 10 with currently-deployed transmission equipment. Further description of wavelength division multiplexed optical communication systems with remodulators is found in commonly-assigned U.S. Pat. No. 5,504,609, the disclosure of which is incorporated by reference herein.

Each information-bearing optical signal produced by an optical transmitter (or an optical remodulator, if present) constitutes a channel in optical system 10, the wavelength of which corresponds to a demultiplexer wavelength in a receiving system. These optical signal channels are output from transmitters 20 and are brought together in optical combiners 30 for conveyance to optical transmission paths 12 and 14. Optical combiner 30 is selected from any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from PIRI Inc., Columbus, Ohio and fused fiber combiners available from Gould, Inc., Millersville, Md. The combination of channels forms a multiplexed optical signal which is output to transmission paths 12 and 14. Transmission paths 12 and 14 are typically single-mode optical fibers such as SMF-28, available from Corning, and TRUEWAVE, available from Lucent and form the principal transmission media for the optical communication system. However, any optical waveguide which is capable of transporting multiple optical wavelengths can be employed for transmission paths 12 and 14 in optical system 10.

Interposed along optical waveguide 10 are one or more optical amplifiers 40. Optical amplifiers 40 are devices which directly increase the strength of plural optical signals without the need for optical-to-electrical conversion. In general, optical amplifiers 40 are selected from optical waveguides doped with a material which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1590 nm provides gain to optical signals when the doped fiber is pumped. Optical amplifiers, their materials, and their operation are further described in Gowar, Ed. *Optical Communication Systems*, Bjarklev, *Optical Fiber Amplifiers: Design and System Applications*, (Artech House, Norwood, Mass.), c. 1993, and in Desurvire, *Erbium-Doped Fiber Amplifiers*, (John Wiley & Sons, Inc., N.Y.), c. 1994, the disclosures of which are incorporated herein by reference. Exemplary optical amplifiers are further described in U.S. Pat. No. 5,696,615, the disclosure of which is incorporated herein by reference.

Following transmission and amplification of the multiplexed optical signals along transmission paths 12 and 14, each optical channel must be demultiplexed and routed to a receiver designated for the particular channel. The multiplexed signal is input to optical splitter 80 which places a portion of the multiplexed signal onto each of plural output paths which communicate with receiving systems 90. Within each receiving system, a particular optical channel is selected (demultiplexed) and passed to a receiver for conversion to an electrical signal. Exemplary receiving systems are described in the '609 patent, incorporated by reference above, although any device or system which selects an optical channel from a WDM optical signal may be employed in receiving system 90.

Figure 2:
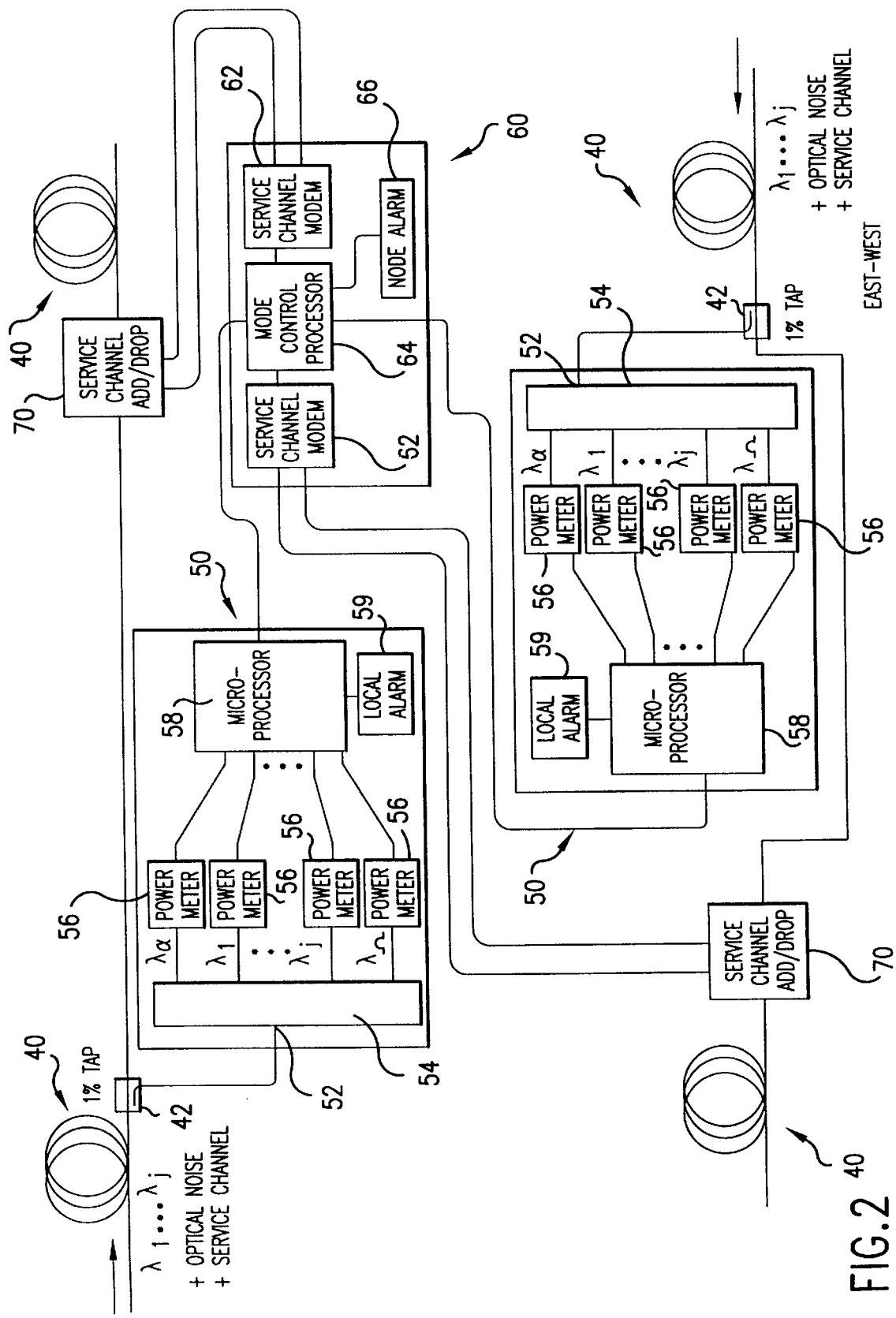
FIG. 2 schematically depicts an optical monitoring system positioned between the stages of a multistage optical amplifier in the wavelength division multiplexed optical communication system of FIG. 1.

FIG. 2 depicts an exemplary embodiment of optical monitoring system 50 used to measure the signal-to-noise ratio of the optical channels in WDM optical system 10. In the depicted embodiment, optical monitoring system 50 receives monitoring light through optical tap 42 which is positioned between the stages of optical amplifier 40. However, it is understood that monitoring system 50 can receive monitoring light from any position within WDM optical communication system 10 and through any device or technique which diverts at least a portion of the transmitted light to the optical monitoring system.

Optical monitoring system 50 receives signals to be monitored through system input 52. Input 52 routes the received optical signal, comprising the optical channels to be monitored and optical noise, to wavelength selecting device 54. In an exemplary embodiment, wavelength selecting device 54 receives an incoming multiplexed optical signal and outputs individual optical channel signals and at least one optical noise sample taken at a wavelength which is not occupied by one of the optical channels. In the embodiment depicted in FIG. 2 optical channels having wavelengths from $\lambda_1$ through $\lambda_j$ (where j ranges from 1 to N and N represents the number of optical channels in the WDM system) define a spectral region occupied by the information-bearing optical signals in the WDM optical system. In an exemplary embodiment, two wavelengths outside this spectral region, $\lambda_a$ and $\lambda_\Omega$, are used to monitor the optical noise in the WDM system. Although the embodiment of FIG. 2 depicts two optical noise samples being measured, it is understood that a single measurement of optical noise at any wavelength not occupied by an optical channel can be used in the signal-to-noise systems of the present invention (including within the spectral region defined by the N optical channels).

Wavelength selecting device 54 outputs optical signals taken at each of these wavelengths to be transmitted to optical power meters 56. Alternatively, a 1×[N+the number of optical noise sample(s)] optical switch can be interposed between wavelength selecting device 54 and a single optical power meter. In this manner, a single optical power meter can be employed to measure the power levels of the optical channels and the optical noise sample(s).

Wavelength selecting device 54 is any device or combination of devices which can take an incoming multiplexed optical signal and output plural optical signals having discrete wavelengths. Generally the detected optical power due to the optical crosstalk of the wavelength selecting device employed should be less than the power level of the optical noise. However, as long as the optical crosstalk characteristic of the wavelength selecting device is well-known, it can be accounted for in the signal-to-noise calculations in the present invention. In the embodiment depicted in FIG. 2, wavelength selecting device 54 is a planar waveguide device such as an arrayed waveguide grating (AWG). AWG devices suitable for use in the present invention are commercially available from PIRI Inc. Other wavelength selecting devices suitable for use with the present invention include diffraction grating spectrometers, scanning Fabry-Perot devices, gratings-based selectors (see, for example, the receiving system grating selectors of U.S. Pat. No. 5,504,609), and interference filters.

Although the embodiment of FIG. 2 shows wavelength selecting device 54 simultaneously outputting each optical channel and the optical noise samples, it is noted that these signals can be output individually (as when using a tunable wavelength selecting device which locks onto desired channel and noise sample wavelengths). As in the case of the optical switch discussed above, this arrangement greatly reduces the number of power meters needed to receive the optical signals output by the wavelength selecting device. Alternatively, the power meter may be integrally formed with the wavelength selecting device (e.g., certain spectral analyzers with an array of detectors).

Power meter(s) 54 convert the incident optical channels and noise sample into output electrical signals indicative of the optical power levels. The power meters are selected from devices that convert optical signals to electrical signals, typically those based on p-i-n photodiode technology. To ascertain the signal-to-noise ratio of the optical channels, the power of the optical noise at each of the optical channel wavelengths is determined. To this end, the power levels of the optical channels and of the noise sample, or samples, are input to microprocessor 58. Microprocessor 58 determines the optical noise at each of the channel wavelengths based upon the measured optical noise sample and programmed information. This programmed information is derived from actual measurements of optical noise for various optical system and optical amplifier configurations (e.g., different numbers of optical channels, different numbers and power levels of optical amplifiers, etc.). The programmed information can be in the form of a reference database of noise values or analytical formulae which characterize the optical noise spectrum for the particular system configuration. The optical noise power level at each optical channel is calculated from the measured reference optical noise sample in conjunction with this programmed information. Optionally, through communication with a microprocessor associated with an optical service channel, microprocessor 58 may be dynamically informed of the number of optical channels, amplifier power levels, precise wavelength of each optical channel, etc.

Figure 3:
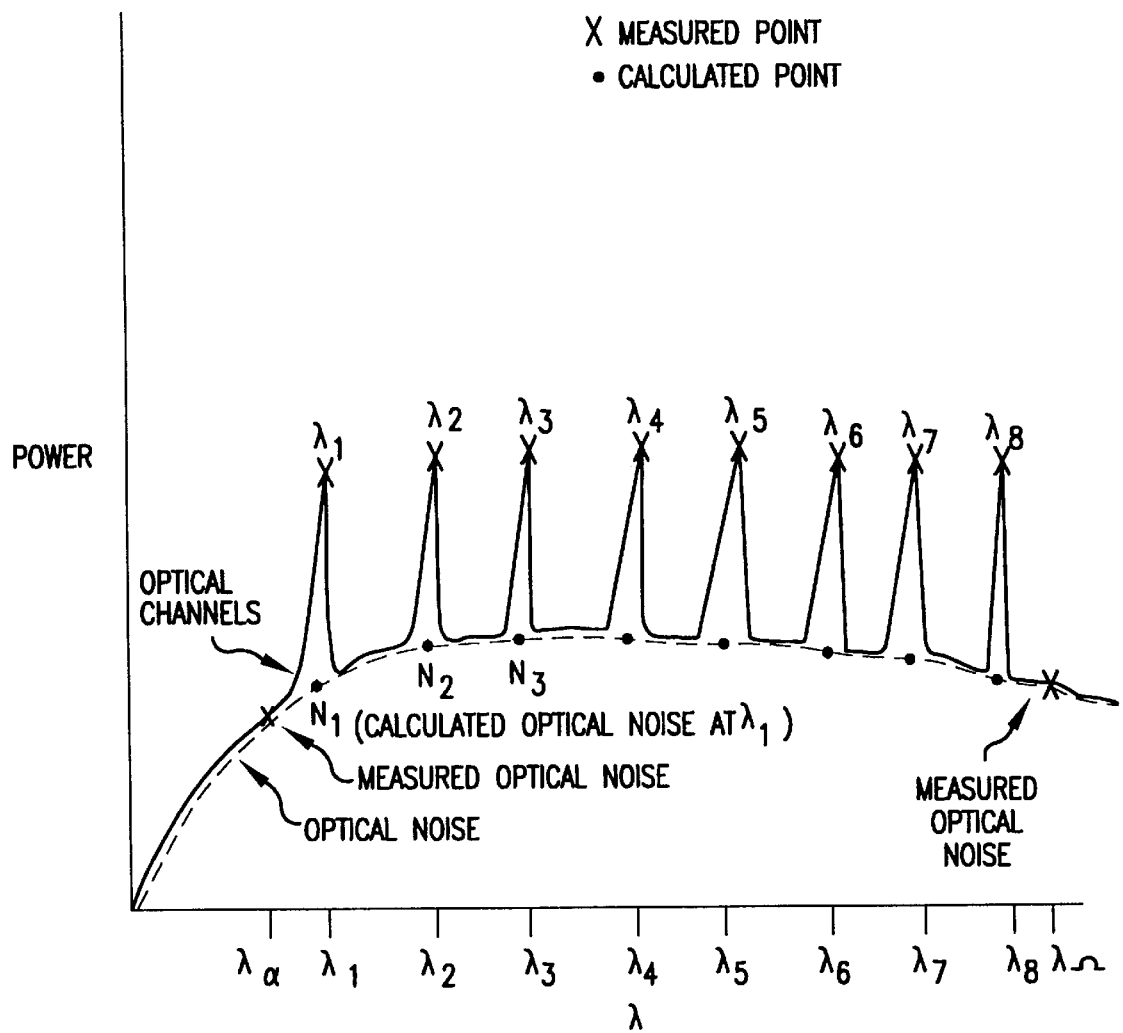
FIG. 3 schematically depicts an optical spectrum showing measured and calculated power levels in the optical monitoring system of FIG. 2.

Using the programmed information, the power levels of the optical channels, and the power level of the optical noise sample, microprocessor 58 calculates the optical noise level at each optical channel wavelength. FIG. 3 schematically depicts the measured and calculated power levels for an 8-channel WDM optical system. From the measured and calculated power levels, the signal-to-noise ratio is determined by dividing the optical channel power level by the calculated optical noise power level at that wavelength. If the optical signal-to-noise ratio falls below a pre-determined critical level for any particular optical channel, an optional local (shelf) alarm 59 can be signaled by microprocessor 58.

Optionally, the signal-to-noise information generated by microprocessor 58 can be routed throughout the WDM optical system through the use of an optical service channel. As seen in FIG. 2, a service channel may be added and dropped between the stages of optical amplifier 40 through service channel add-drop device 70. Service channel add-drop device 70 is selected from any device or group of devices which can remove and insert a particular optical channel used to carry system monitoring information or instructions. Exemplary add-drop configurations for use between the stages of optical amplifiers are disclosed in commonly-assigned U.S. Pat. No. 5,532,864, the disclosure of which is incorporated by reference herein.

The optical service channel is routed to service channel system 60 which includes service channel modems 62 for generating and receiving optical service channels. Service channel modems 62 (one modem for the west-east transmission path and another modem for the east-west transmission path) communicate with node control processor 64 for sending information from and placing information onto the optical service channels. Optionally, node control processor 64 is linked to microprocessor 58 for receiving information about the signal-to-noise levels of the optical channels and for sending system status information to microprocessor 58. If the signal-to-noise level falls below a predetermined level, the node control processor can signal an optional node alarm 66. Additionally, the node control process can encode the either or both of the west-east and east-west optical service channels with the signal-to-noise information, ensuring that this information reaches the end nodes of the optical communication system.

Alternatively, the power measurements from power meters 56 can be routed directly to node control processor 64, eliminating the need for microprocessor 58. In such an embodiment, the node control processor is pre-programmed with the information concerning spectral noise.

While the foregoing invention has been described in terms of the embodiments discussed above, numerous variations are possible. For example, the signal-to-noise monitoring systems of the present invention can be positioned at numerous locations throughout a WDM optical system such as at the end nodes and at optical add-drop multiplexing locations. Generally, the optical monitoring systems can be positioned at any location which includes an optical device which sends a portion of a WDM optical signal to the monitoring system. Moreover, the optical monitoring systems of the present invention can be separated from the wavelength division multiplexed optical system and packaged as test equipment for use by craft at a variety of locations in the optical system. Accordingly, modifications and changes such as those suggested above, but not limited thereto, are considered to be within the scope of following claims.

What is claimed is:

1. A signal-to-noise monitoring system for a wavelength division multiplexed optical communication system comprising:

wavelength selecting means for receiving a wavelength division multiplexed optical communication signal comprising N optical channels, where N is a whole number greater than or equal to 2, and optical noise, the wavelength selecting means separately outputting optical signals corresponding to each of the N optical channels and at least a first optical noise sample taken at a wavelength which is not occupied by one of the N optical channels;

at least one optical power meter optically communicating with the wavelength selecting means for measuring the optical power of each of the N optical channels and the optical noise sample, the optical power meter outputting an electrical signal indicating the strength of a measured optical channel or of the optical noise sample;

data analyzing means electrically communicating with the optical power meter for receiving electrical signals output by the power meter, the data analyzing means calculating optical noise values at the wavelengths of each of the N optical channels based upon the noise sample and determining the signal to noise ratio of each optical channel from the measured power levels of the optical channel and the calculated noise level for each optical channel.

2. A signal-to-noise monitoring system for a wavelength division multiplexed optical communication system as recited in claim 1 wherein the data analyzing means comprises a microprocessor.

3. A signal-to-noise monitoring system for a wavelength division multiplexed optical communication system as recited in claim 1 wherein the N optical channels define a spectral region occupied by the information-bearing optical signals and the optical noise sample is taken at a wavelength outside said spectral region.

4. A signal-to-noise monitoring system for a wavelength division multiplexed optical communication system as recited in claim 1 further comprising service channel-generating means for creating an optical service channel and a microprocessor electrically communicating with the service channel generating means and with the data analyzing means such that information concerning the signal-to-noise ratio of the optical channels can be imparted to the optical service channel.

5. A signal-to-noise monitoring system for a wavelength division multiplexed optical communication system as recited in claim 1 wherein the wavelength selecting means is an arrayed waveguide grating.

6. A multiple-stage optical amplifier comprising at least first and second stages having the signal-to-noise monitoring system of claim 1 positioned between the first and second stages.

7. A signal-to-noise monitoring system for a wavelength division multiplexed optical communication system comprising:

wavelength selecting means for receiving a wavelength division multiplexed optical communication signal comprising N optical channels, where N is a whole number greater than or equal to 2, and optical noise from amplified spontaneous emission, the N optical channels defining a spectral region occupied by information-bearing channels in the WDM system, the wavelength selecting means outputting each of the N optical channels and at least a first spectral sampling signal at an optical wavelength which is shorter than the shortest wavelength of said spectral region and at least a second spectral sampling signal at an optical wavelength which is longer than the longest optical wavelength of said spectral region;

a plurality of optical power meters optically communicating with the wavelength selecting means for measuring the optical power of each of the N optical channels and the first and second spectral sampling signals, each optical power meter outputting an electrical signal indicating the strength of a measured optical channel or of the spectral sampling signals;

a microprocessor electrically communicating with the plurality of optical power meters for receiving electrical signals output by the power meters, the data analyzing means calculating optical noise values at the wavelengths of each of the N optical channels based upon the measured noise samples and determining the signal to noise ratio of each optical channel from the measured power levels of the optical channel and the calculated noise level for each optical channel.

8. A signal-to-noise monitoring system for a wavelength division multiplexed optical communication system as recited in claim 7 wherein the wavelength selecting means is an arrayed waveguide grating.

* * * * *